United States Patent [19]

Poster

[11] 3,734,001
[45] May 22, 1973

[54] BASTING MATERIAL INJECTION SYSTEM

[76] Inventor: Marvin B. Poster, Rte. 1, Forest Hills, Harrisonburg, Va. 22801

[22] Filed: June 8, 1971

[21] Appl. No.: 151,070

[52] U.S. Cl..................................99/532, 68/201
[51] Int. Cl. ...............................A23b 1/16
[58] Field of Search.................99/257, 254–255, 99/256, 532; 27/24; 128/216; 239/320, 348, 321–322, 323–324; 68/201

[56] References Cited

UNITED STATES PATENTS

| | | | |
|---|---|---|---|
| 2,755,732 | 7/1956 | Sanderson | 99/257 |
| 3,511,164 | 5/1970 | Strandine et al. | 99/257 |
| 3,507,207 | 4/1970 | Rogers et al. | 99/257 |
| 3,149,555 | 9/1964 | Baum et al. | 99/257 |
| 3,428,000 | 2/1969 | Gagnon | 99/256 X |
| 982,671 | 1/1911 | Hardy | 99/257 |
| 2,960,925 | 11/1960 | Bradley | 99/256 |
| 3,035,508 | 5/1962 | Nelson | 99/257 |

*Primary Examiner*—William I. Price
*Assistant Examiner*—Arthur O. Henderson
*Attorney*—Kenway, Jenney & Hildreth

[57] ABSTRACT

In the injection system disclosed herein, a precisely preselectable quantity of basting material is injected into the flesh of a meat fowl by means of an injection cylinder, the stroke of which is precisely controlled by a pilot valve mechanism. The injection cylinder draws basting material from a supply conduit through which the material is continuously circulated, assuring that suitably mixed basting material is continuously available.

6 Claims, 4 Drawing Figures

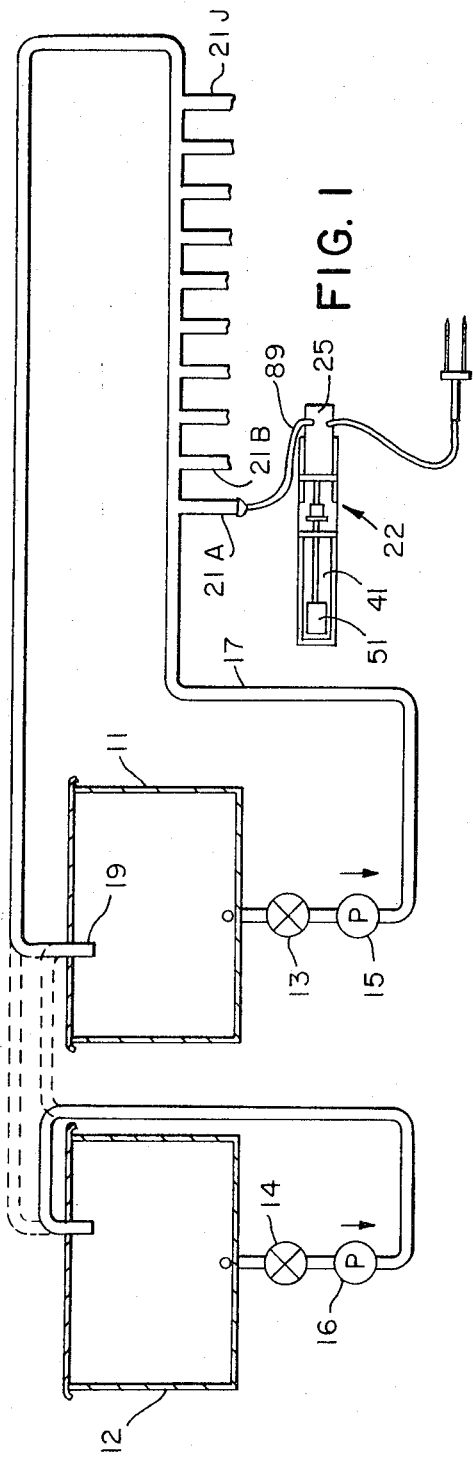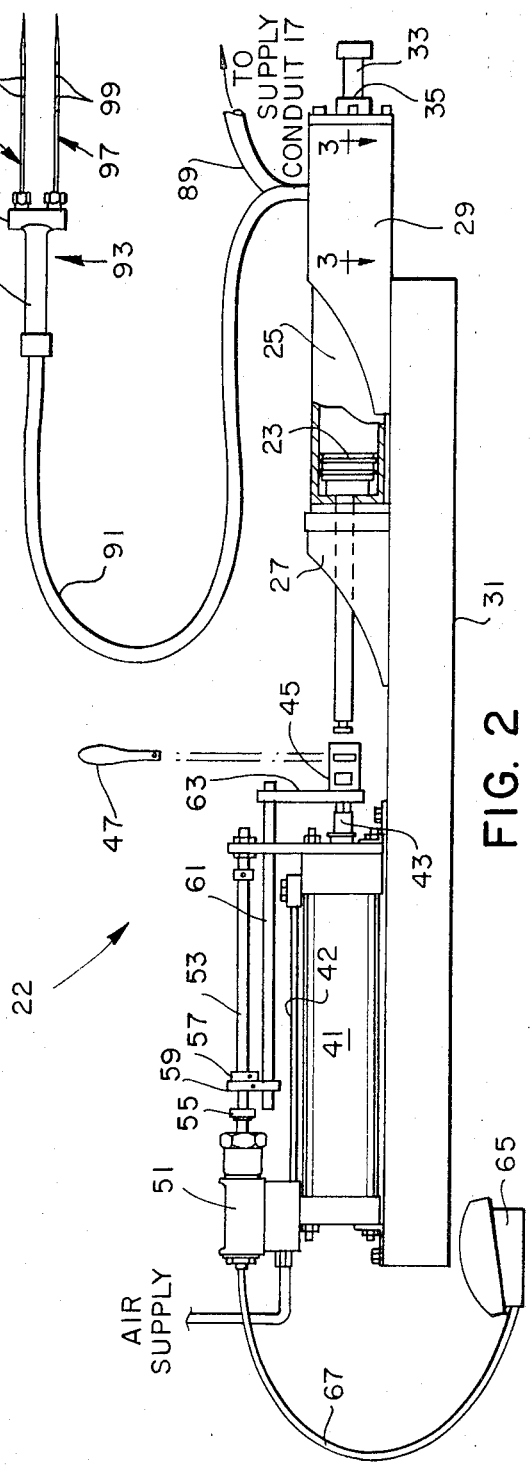

Marvin B. Poster
INVENTOR

BY
Kenway Jenney & Hildreth
ATTORNEYS

BASTING MATERIAL INJECTION SYSTEM

BACKGROUND OF THE INVENTION

This invention relates to a system for applying a self-basting material to a meat fowl and more particularly to such a system in which a precisely predetermined quantity of basting material is injected into the flesh of the fowl.

Various systems have been proposed heretofore for applying basting material to meat fowl, such as turkeys or chickens. Such systems have typically involved the injection of basting material through the skin of the bird by means of a plurality of needles operating on a timed injection cycle or by introducing the basting material between the skin and the flesh of the fowl. With such prior art systems, however, it has typically been difficult to obtain the application of an exactly predetermined quantity of basting material. Precise control is, however, highly desirable since government regulations limit the maximum amount of such material which may be applied and, in the case of basting materials, it is necessary to closely approach the regulated maximum if satisfactory basting is to be obtained upon cooking.

Among the several objects of the present invention may be noted the provision of an injection system for basting materials which will introduce a precisely predetermined and preselected quantity of basting material into the flesh of a meat fowl; the provision of such a system in which the amount of basting material injected may be easily adjusted; the provision of such a system which insures that the material injected is satisfactorily mixed and at a suitable temperature; the provision of such a system which can be readily cleaned so as to meet government meat packing standards; the provision of such a system which is highly reliable and is of relatively simple and inexpensive construction. Other objects will be in part apparent and in part pointed out hereinafter.

SUMMARY OF THE INVENTION

Briefly, the injection system of the present invention employs an injection cylinder having a piston which is driven by an air-operated drive cylinder, the stroke of the drive cylinder being precisely adjustable by means of stops which control the action of a pilot valve through which air under pressure is applied to the drive cylinder. Preferably, the injection cylinder draws basting material, through a check valve, from a supply conduit through which the basting material is continuously circulated under pressure. The injection cylinder drives the basting material, through a second check valve, to an injection needle by means of which the material is introduced into the flesh of a meat fowl being treated.

BRIEF DESCRIPTION OF THE DRAWINGS

FIG. 1 is a flow diagram indicating the manner in which a plurality of injectors constructed in accordance with the present invention are supplied with basting material from a common supply loop;

FIG. 2 is a side view of an injector of the present invention;

Corresponding reference characters indicate corresponding parts throughout the several views of the drawings.

DESCRIPTION OF THE PREFERRED EMBODIMENT

Figure 3:
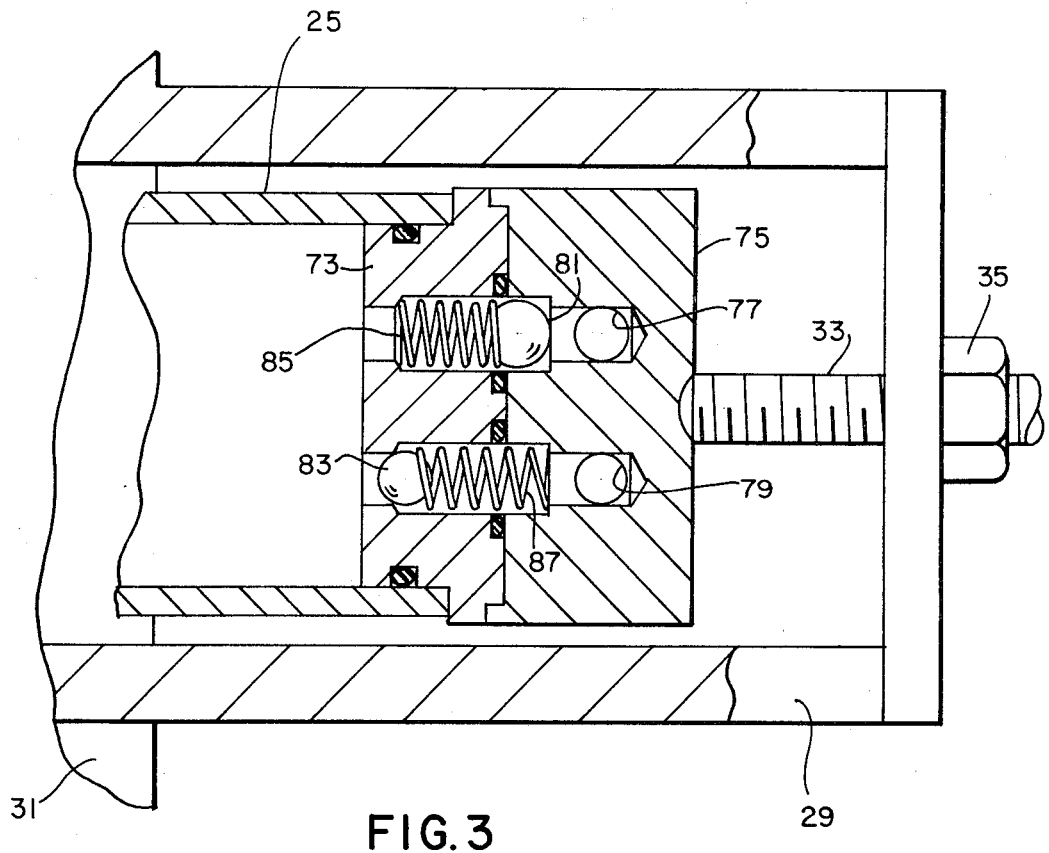
FIG. 3 is a section taken on the line 3—3 of FIG. 2.
Figure 4:
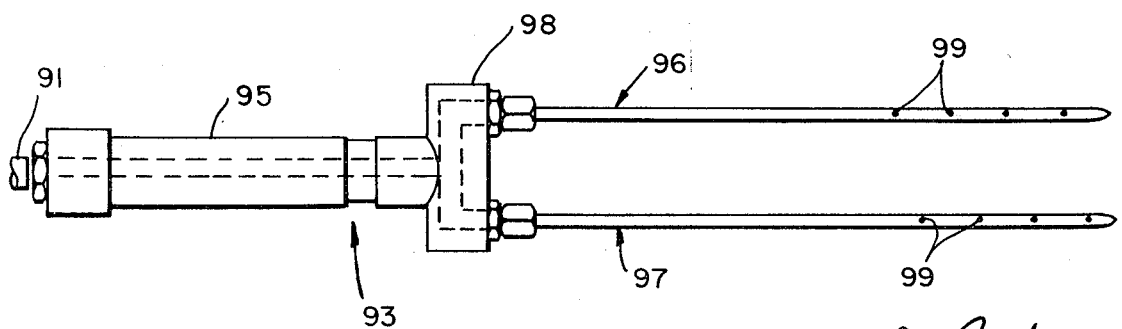
FIG. 4 is a plan view of an injection wand assembly employed in the injector of FIG. 2.

As is understood basting materials suitable for application to meat fowl prior to cooking comprise a mixture of ingredients, some of the ingredients being fatty and having a tendency to separate. Accordingly, the system of the present invention employs a supply arrangement in which the basting material is continually circulating. In FIG. 1, a suitably refrigerated tank is indicated at 11. Basting material is taken from the tank through a valve 13 and driven by a pump 15, under pressure, through a supply conduit 17 which is formed in a loop. The loop returns to the top of the tank 11 where it is connected to a spray nozzle 19. The pump 15 is run continuously so that the ingredients of the basting material are continuously circulated and mixed. Likewise, none of the basting material tends to stand in the conduit 17. Further, due to the continuous circulation, the material in the conduit 17 itself tends to be substantially at the same temperature as that maintained in the tank 11. A second tank 12, valve 14, and pump 16 are preferably provided so that material preparation and mixing can take place in one tank while the second is used in production, suitable cross connections being provided to permit flexibility of operation.

The conduit 17 is tapped at a plurality of points 21A–21J for providing basting material, under pressure, to respective injection stations, one such injection station being indicated at 22, generally.

With reference to FIG. 2, each injection station comprises an injection cylinder 25 having a piston 23 slidable therewithin. The injection cylinder and piston are held between a pair of brackets 27 and 29 mounted on a frame 31, any end play of the cylinder relative to the brackets being taken up by a clamp screw 33 provided with a lock nut 35.

Also mounted on the frame 31 is a double-acting air cylinder 41 having an actuating rod 43 which can be releasably connected to the injection cylinder piston 23 by means of a coupling 45 and a locking key 47 of essentially conventional construction.

Air under pressure from a suitably filtered and regulated source (not shown) is selectively provided to either side of the double-acting cylinder 41 through a conventional pilot-actuated stroke-control valve 51. A stroke-sensing rod 53 extends from valve 51 and carries a pair of adjustable limit stops 55 and 57. A stop-engaging member 59, which is slidable on the rod 53 between the stops 55 and 57, is coupled to the drive cylinder actuating rod 43 so as to move therewith by means of a rod 61 and a bracket 63. A pedal-operated pilot vent valve 65 is connected to the stroke control valve 51 through a flexible tube 67 for controlling the direction of movement of the drive cylinder actuator rod 43.

The operation of the stroke-control valve 51 is such that, when the pedal valve 65 is actuated, air is supplied to the cylinder 41 so as to drive the actuator rod 43 to the right until the member 59 engages the stop 57. The incremental movement of the rod 53 thereby produced causes the valve 51 to equalize the air pressure on the two sides of the cylinder 41 so as to quickly stop the travel of the actuator rod 43. Conversely, when the pedal valve 65 is released, the stroke control valve 51 provides air to the right hand side of the cylinder 41, through a conduit 42, so as to drive the actuating rod to the left as seen in FIG. 2. When the member 59 engages the left hand stop 55, the incremental movement thereby transmitted to the rod 53 causes the valve 51 to again balance the air pressure on the two sides of the cylinder 41 so that the movement of the actuating rod 43 is again quickly stopped. In the above manner, a very precisely predetermined stroke of the actuating rod 43 is obtained for each operation of the pedal valve 65. Since the actuating rod 43 is coupled to the piston 23 of the injection cylinder 25, it can be seen that a correspondingly precisely predetermined change in displacement will occur within the cylinder 25.

The right hand end of cylinder 25 comprises a valve assembly which may be seen in greater detail in FIG. 3. The valve assembly comprises a pair of members 73 and 75. An upwardly extending inlet port 77 and an upwardly extending outlet port 79 communicate with the interior volume of the cylinder 25 through respective ball check valves 81 and 83 provided with respective biasing springs 85 and 87. Each of the ball check valve members 81 and 83 cooperates with a matching shoulder in the respective inlet or outlet conduit in conventional manner to permit flow in one direction only, the valves being oppositely oriented as indicated. The inlet port 77 is connected, through a tube 89, to the supply conduit 17 so that basting material can be drawn into the cylinder 25 during the left hand movement of the piston 23 while the outlet port 79 is coupled, through a flexible tube 91, to an injection wand 93 so that basting material will be provided thereto from the cylinder during right hand movement of the piston 23.

Injection wand 93 comprises a tubular handle 95 carrying a pair of hollow needles 96 and 97 which are mounted on the handle by means of a suitable manifold block 98. Each of the needles 96 and 97 includes a plurality of fine transverse holes or ports 99 through which the basting material is forced when the piston 23 moves to the right.

In operation, fowl carcasses being processed are pre-weighed preparatory to the application of the basting material and are sorted so that birds of essentially a single weight are processed at a given injection station. The stops 55 and 57 at that station are then adjusted so that the amount of basting material ejected from the cylinder 25 during a single cycle corresponds to the respective bird weight and the pertinent government regulations. In operation, the operator inserts the needles 96 and 97 into that portion of the breast meat which is exposed near the tail of the fowl after cleaning, rather than through the skin thereof. The length of the needles and the spacings and numbers of the ports 99 are selected in correspondence with the type of bird being processed so that the basting material is well distributed throughout the flesh of the bird. Likewise, the separation between the needles 96 and 97 is chosen so that the needles can pass on either side of the bird's breast bone.

Since the injection cylinder draws basting material from a conduit through which that material is continuously circulating, the material does not, in normal operation, remain stationary in any part of the apparatus for a significant length of time and thus the material being injected is reliably mixed and retains a desirable chill. Further, since the apparatus operates on a controlled, positive-displacement basis, the basting material can vary in viscosity and density over a wide range and yet the amount injected will be accurately controlled.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An injection system for introducing a preselectable quantity of liquid material into a meat product, said injection system comprising:
    an injection cylinder having a piston slidable therewithin;
    means for providing said material under pressure to said injection cylinder including a refrigerated tank, a loop conduit which returns to said tank, and pump means for circulating liquid material from said tank around said loop conduit, there being a check valve permitting flow of said material into said injection cylinder from said loop conduit as said piston is withdrawn therefrom;
    at least one injection needle adapted to be inserted into said meat product;
    means connecting said injection cylinder with said injection needle, including a check valve permitting flow of said material from said injection cylinder to said needle as said piston is driven into said injection cylinder;
    a drive cylinder for operating said injector piston;
    means for selectively supplying air under pressure to said drive cylinder including a pilot-operated, stroke-control valve having adjustable stops permitting the stroke of said drive cylinder to be precisely adjusted; and
    an operator-controllable pilot valve interconnected with said stroke-control valve for selectively initiating a stroke of said drive cylinder, whereby an operator can readily control an injection cycle in which a precisely preselectable quantity of said material is driven to said needle for injection into the flesh of a meat fowl being treated.

2. An injection system as set forth in claim 1 comprising an injection wand assembly connected to said injection cylinder by means of a flexible tube and having a pair of spaced parallel needles, each of which is provided with a plurality of lateral ports spaced along its length whereby said material is distributed upon injection.

3. An injection system for introducing a preselectable quantity of basting material into the flesh of a meat fowl, said injection system comprising:
    a refrigerated supply tank;
    a supply conduit comprising a loop which returns to said tank;
    a pump for drawing basting material from said tank and providing a continuous flow of said material under pressure to said conduit; and
    a plurality of injection stations supplied from said conduit, each station including:
        an injection cylinder having a piston slidable therewithin, means connecting said injection cylinder with said supply conduit, including a check valve permitting flow of said material into said injection cylinder as said piston is withdrawn therefrom, at least one injection needle adapted to be inserted into the flesh of a meat fowl, means connecting said injection cylinder with said injection needle, including a check valve permitting flow of said material from said injection cylinder to said needle as said piston is driven into said injection cylinder, a drive cylinder for operating said injector piston;

means for selectively supplying air under pressure to said drive cylinder including a pilot-operated, stroke-control valve having adjustable stops permitting the stroke of said drive cylinder to be precisely adjusted, and an operator-controllable pilot valve interconnected with said stroke-control valve for selectively initiating a stroke of said drive cylinder, whereby an operator can readily control an injection cycle in which a precisely preselectable quantity of basting material is driven to said needle for injection into the flesh of a meat fowl being treated.

4. An injection system as set forth in claim 3 comprising an injection wand assembly connected to said injection cylinder by means of a flexible tube and having a pair of spaced parallel needles each of which is provides with a plurality of lateral ports spaced along its length whereby said material is distributed upon injection.

5. An injection system as set forth in claim 3 wherein said injection cylinder is releasably mounted on a frame with said drive cylinder and said drive cylinder includes a drive rod which is releasably coupled to said piston.

6. An injection system as set forth in claim 3 wherein said pilot valve is pedal operated.

* * * * *